United States Patent
Finn et al.

(10) Patent No.: US 8,332,781 B2
(45) Date of Patent: Dec. 11, 2012

(54) VIRTUAL OBJECT TAGGING FOR USE IN MARKETING

(75) Inventors: Peter G. Finn, Brampton (CA); Rick A. Hamilton, II, Charlottesville, VA (US); Steven M. Harrison, Bremerton, WA (US); Ian D. Smith, Ikley (GB)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 12/030,422

(22) Filed: Feb. 13, 2008

(65) Prior Publication Data

US 2009/0204907 A1    Aug. 13, 2009

(51) Int. Cl.
G06F 3/048 (2006.01)
G06Q 30/00 (2012.01)

(52) U.S. Cl. ...................... 715/848; 705/14.66

(58) Field of Classification Search ............. 715/706, 715/757, 758, 848, 849, 850, 851, 852; 705/10, 705/14.4, 14.49, 14.66; 455/456.1, 456.3
See application file for complete search history.

(56) References Cited

U.S. PATENT DOCUMENTS

| | | | |
|---|---|---|---|
| 6,336,133 B1* | 1/2002 | Morris et al. | 709/204 |
| 7,284,202 B1* | 10/2007 | Zenith | 715/744 |
| 2002/0076674 A1* | 6/2002 | Kaplan | 434/107 |
| 2004/0015608 A1* | 1/2004 | Ellis et al. | 709/246 |
| 2004/0220850 A1* | 11/2004 | Ferrer et al. | 705/14 |
| 2005/0143174 A1* | 6/2005 | Goldman et al. | 463/42 |
| 2006/0235790 A1* | 10/2006 | Jung et al. | 705/39 |
| 2006/0235791 A1* | 10/2006 | Jung et al. | 705/39 |
| 2007/0038559 A1* | 2/2007 | Jung et al. | 705/39 |
| 2007/0064626 A1* | 3/2007 | Evans | 370/254 |
| 2007/0100898 A1* | 5/2007 | Petras et al. | 707/200 |
| 2007/0112624 A1* | 5/2007 | Jung et al. | 705/14 |
| 2007/0118420 A1* | 5/2007 | Jung et al. | 705/10 |
| 2007/0156509 A1* | 7/2007 | Jung et al. | 705/10 |
| 2008/0091692 A1* | 4/2008 | Keith et al. | 707/100 |
| 2008/0235216 A1* | 9/2008 | Ruttenberg | 707/5 |
| 2009/0058862 A1* | 3/2009 | Finn et al. | 345/473 |
| 2009/0100351 A1* | 4/2009 | Bromenshenkel et al. | 715/757 |
| 2009/0113349 A1* | 4/2009 | Zohar et al. | 715/852 |
| 2009/0150778 A1* | 6/2009 | Nicol, II | 715/706 |
| 2009/0183071 A1* | 7/2009 | Smith et al. | 715/706 |
| 2009/0235167 A1* | 9/2009 | Boyer et al. | 715/708 |

OTHER PUBLICATIONS

Hemp, P. Avatar-Based Marketing. Harvard Business Review. Jun. 2006.*
Kadobayashi et al, 3D Model Annotation from Multiple Viewpoints for Croquet, Proceedings of the Fourth International Conference on Creating, Connecting and Collaborating through Computing, 2006.*

* cited by examiner

*Primary Examiner* — Ryan Pitaro
*Assistant Examiner* — Ryan Barrett
(74) *Attorney, Agent, or Firm* — William E. Schiesser; Hoffman Warnick LLC

(57) ABSTRACT

A solution for conducting a marketing activity is provided. Activities in a virtual environment are monitored and descriptions of a virtual object involved in the activities are collected. A tag may be assigned to the virtual object based on the characteristic of the activities and/or the descriptions of the virtual object. The tag may be used in marketing activities conducted in relation to the virtual environment.

18 Claims, 3 Drawing Sheets

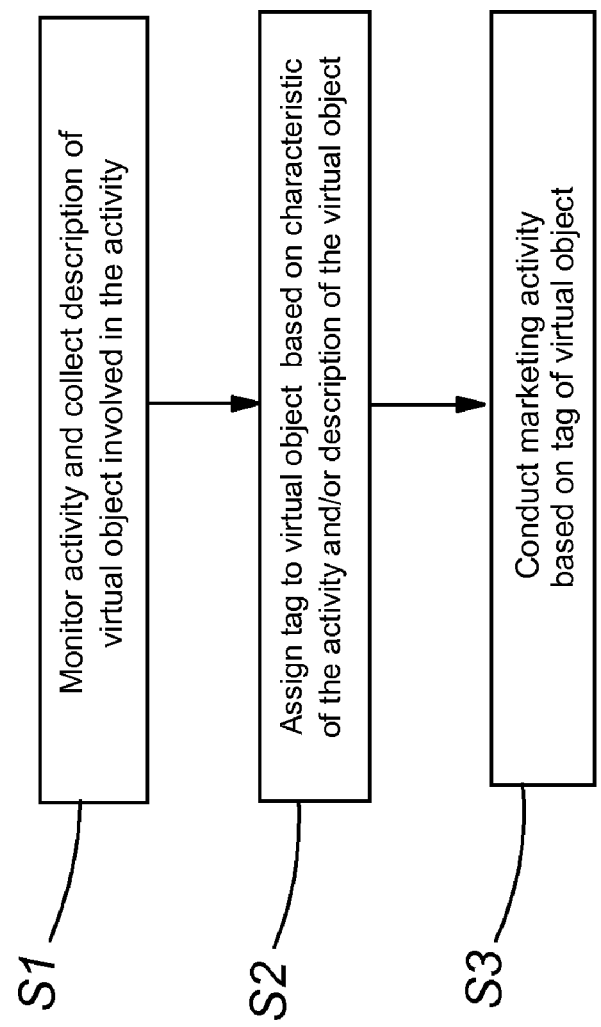

VIRTUAL OBJECT TAGGING FOR USE IN MARKETING

FIELD OF THE INVENTION

The present invention relates in general to a virtual world, and more particularly to conducting marketing activities in relation to the virtual world based on a tag assigned to a virtual object thereof.

BACKGROUND OF THE INVENTION

Virtual worlds represent the latest technological forefront and present a tremendous new outlet for both structured and unstructured virtual collaboration, virtual gaming and exploration, and real-life simulation in virtual world spaces. A virtual world is a computer-based simulated environment for a user to participate via a virtual representation, referred to as an "avatar". In a virtual world, e.g., SECOND LIFE® owned by Linden Lab, a virtual world user is provided with tools to view, navigate, and modify the virtual world space and participate in its virtual activities. These virtual activities, along with various yet to be created new dimensions, provide a wide open arena for creative and new advertising methods and mechanisms. A virtual universe is a combination of multiple virtual worlds that are interlinked. The interlinked virtual worlds are not currently in place but have been discussed in open forums and are well understood in terms of enabling arts.

SUMMARY OF THE INVENTION

A first aspect of the invention is directed to a method for conducting a marketing activity, the method comprising: monitoring an activity in a virtual environment; assigning a tag to a virtual object involved in the monitored activity based on at least one of: a characteristic of the activity or a description of the virtual object provided by an avatar; and conducting a marketing activity based on the tag.

A second aspect of the invention is directed to a system for conducting a marketing activity, the system comprising: means for monitoring an activity in a virtual environment; means for assigning a tag to a virtual object involved in the monitored activity based on at least one of: a characteristic of the activity or a description of the virtual object provided by an avatar; and means for conducting a marketing activity based on the tag.

A third aspect of the invention is directed to a computer program product embodied in a computer readable medium comprising: computer usable program code which, when executed by a computer system, enables the computer system to: monitor an activity in a virtual environment; assign a tag to a virtual object involved in the monitored activity based on at least one of: a characteristic of the activity or a description of the virtual object provided by an avatar; and conduct a marketing activity based on the tag.

A fourth aspect of the invention is directed to a method for providing a system for conducting a marketing activity, comprising: at least one of creating, maintaining, deploying and supporting a computer infrastructure being operable to: monitor an activity in a virtual environment; assign a tag to a virtual object involved in the monitored activity based on at least one of: a characteristic of the activity or a description of the virtual object provided by an avatar; and conduct a marketing activity based on the tag.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE DRAWINGS

The embodiments of this invention will be described in detail, with reference to the following figures, wherein like designations denote like elements, and wherein:

FIG. 3 shows an embodiment of the operation of a marketing analysis system.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

1. System Overview

Figure 1:
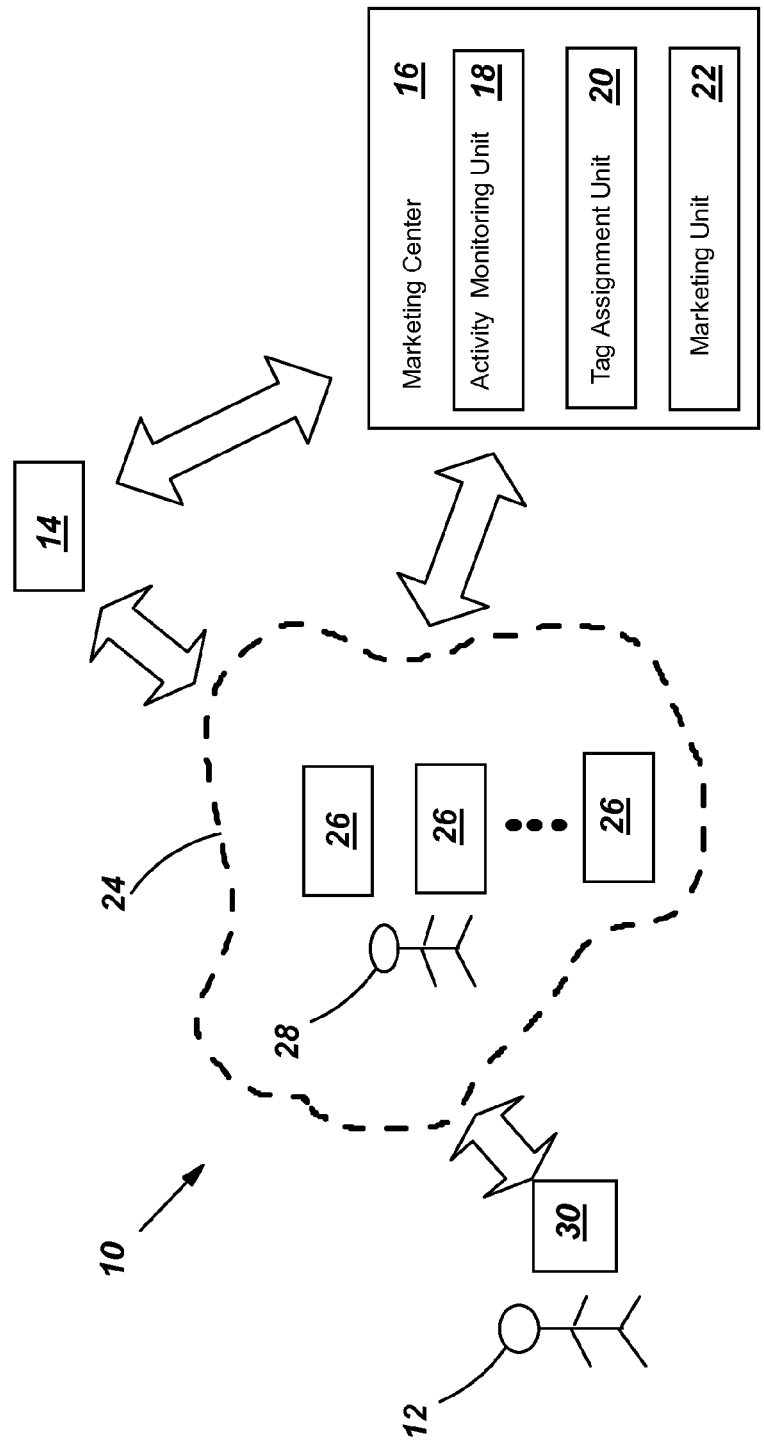
FIG. 1 shows a block diagram of a system according to an embodiment.

FIG. 1 shows a block diagram of a system 10 according to an embodiment. System 10 includes a virtual world user 12, a virtual world server 14 and a marketing center 16. Marketing center 16 includes an activity monitoring unit 18, a tag assignment unit 20, and a marketing unit 22. Virtual world server 14 supports a virtual universe 24 including multiple virtual environments 26 where virtual world user 12 may conduct activities via a virtual world representation 28 usually referred to as an avatar 28. In operation, user 12 attends virtual universe 24 through a virtual world client 30, e.g., a personal computer, communicatively coupled to virtual world server 14. Activity monitoring unit 18 monitors an activity of avatar 28 in virtual universe 24 or specifically in a virtual environment 26. Based on the monitoring results, tag assignment unit 20 determines a suitable tag assigned to a virtual object involved in the activity. In the current description, a virtual object refers to any virtual representation in virtual universe 24 including, for example, avatar 28, virtual environment 26 and/or a virtual place, e.g., a club, within virtual environment 26, an article in virtual environment 26, such as a car of avatar 28, etc. The assigned tag may be used by marketing unit 22 in determining and implementing a marketing activity in relation to virtual universe 24.

As should be appreciated, virtual world server 14 and marketing center 16 and components thereof may be positioned at the same physical location or may be at different physical locations. Marketing center 16 may be implemented through a computer system.

The interaction of system 10 components will be described herein in detail together with an illustrative computer environment.

2. Computer Environment

Figure 2:
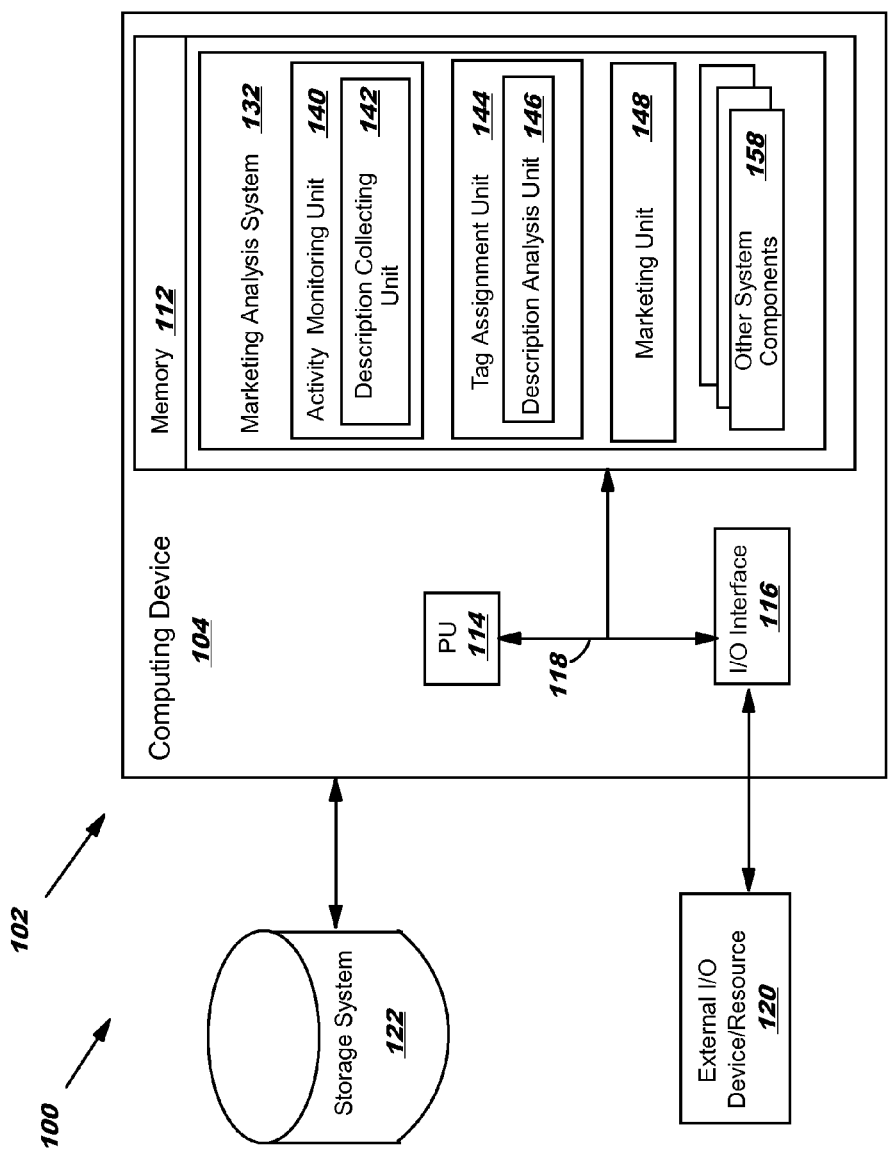
FIG. 2 shows a block diagram of an illustrative computer environment according to an embodiment.

FIG. 2 shows an illustrative environment 100 for conducting a marketing activity. To this extent, environment 100 includes a computer infrastructure 102 that can perform the various processes described herein for conducting a marketing activity in relation to virtual universe 24 (FIG. 1). In particular, computer infrastructure 102 is shown including a computing device 104 that comprises a marketing analysis system 132, which enables computing device 104 to perform the process(es) described herein.

Computing device 104 is shown including a memory 112, a processing unit (PU) 114, an input/output (I/O) interface 116, and a bus 118. Further, computing device 104 is shown in communication with an external I/O device/resource 120 and a storage system 122. In general, PU 114 executes computer program code, such as marketing analysis system 132, that is stored in memory 112 and/or storage system 122. While executing computer program code, PU 114 can read and/or write data to/from memory 112, storage system 122, and/or I/O interface 116. Bus 118 provides a communications link between each of the components in computing device 104. I/O interface 116 can comprise any device that enables a user to interact with computing device 104 or any device that enables computing device 104 to communicate with one or more other computing devices. External I/O device/resource 120 can be coupled to the system either directly or through I/O interface 116.

In any event, computing device 104 can comprise any general purpose computing article of manufacture capable of executing computer program code installed thereon. However, it is understood that computing device 104 and marketing analysis system 132 are only representative of various possible equivalent computing devices that may perform the various processes of the invention. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the invention. For example, in an embodiment, computer infrastructure 102 comprises two or more computing devices that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques. Marketing analysis system 132 includes an activity monitoring unit 140 including a description collecting unit 142; a tag assignment unit 144 including a description analysis unit 146; a marketing unit 148; and other system components 158. Other system components 158 may include any now known or later developed parts of marketing analysis system 132 not individually delineated herein, but understood by those skilled in the art. As should be appreciated, components of computer infrastructure 102 and marketing analysis system 132 may be located at different physical locations or at the same physical location.

According to an embodiment, computer infrastructure 102 and marketing analysis system 132 may be used to implement, inter alia, marketing center 16 of system 10 (FIG. 1). For example, activity monitoring unit 140, tag assignment unit 144 and marketing unit 148 may implement activity monitoring unit 18, tag assignment unit 20 and marketing unit 22 (FIG. 1), respectively.

Inputs/outputs to computer infrastructure 102, e.g., through external I/O device/resource 120 and/or I/O interface 116, may include information communicated between and among various components of system 10, as is described herein in detail. The operation of system 10 and marketing analysis system 132 are described together herein in detail.

3. Operation Methodology

An embodiment of the operation of marketing analysis system 132 is shown in the flow diagram of FIG. 3. Referring to FIGS. 1-3, collectively, in process S1, activity monitoring unit 140 monitors an activity of an avatar 28 in a virtual environment 26. Any method may be used in the monitoring, and all are included. For example, activity monitoring unit 140 may coordinate with virtual world server 14 in conducting the monitoring. Activity monitoring unit 140 may instruct virtual world server 14 to report, preferably in substantially real time, a record of the activities of an avatar 28 in virtual environment 26. Activity monitoring unit 140 may choose to monitor certain types of activities of avatar 28 or may collect all activities. In addition, the context of the activities of avatar 28 in virtual universe 24/virtual environment 26 may also be monitored to, e.g., interpret the activities. For example, activity monitoring unit 140 may collect data regarding the virtual places, e.g., a club in a virtual environment (e.g., a metropolitan) 26, and/or articles in the virtual environment 26, e.g., brands of wines consumed by the avatar 28 in the club. Activity monitoring unit 140 may also collect data regarding other avatars 28 involved in the activities of the avatar 28 of interest.

In addition, description collecting unit 142 may collect descriptions of a virtual object involved in the monitored activities. For example, the description of a given avatar 28 may be provided by the given avatar 28 itself, and/or by another avatar 28 involved in the activity. The description may be collected from the communication between avatars 28 in virtual environment 26, e.g., an avatar 28 describes another avatar 28 in a conversation, or may be collected through an avatar 28/a user 12 of an avatar 28 privately submitting a description of another avatar 28. According to an embodiment, the description made by another avatar 28/user 12 may not be edited by the avatar 28 described. According to another embodiment, the description made by another avatar 28/user 12 may be edited to some degree. For example, derogatory or profane terms may be deemed inappropriate, and thus may be deleted.

Regarding a virtual place, the description may be provided by avatars 28 entering the virtual place. For example, description collecting unit 142 may collect descriptions/opinions from avatars 28 regarding why they enter a given virtual place and/or what kinds of activities they believe belong to the given virtual place. According to an embodiment, description collecting unit 142 may also assign a weight to a collected description based on, e.g., a credibility of the avatar 28 providing the description.

In process S2, tag assignment unit 144 assigns a tag to a virtual object involved in the monitored activity based on at least one of: a characteristic of the activity or a description of the virtual object provided by an avatar 28. According to an embodiment, a tag may include a term(s) indicating a characteristic of a virtual object that is related to potential marketing activities. For example, a tag of an avatar 28 may indicate a current interest of the avatar 28 such that an advertisement may be displayed to the avatar 28 based on the interest. A tag of a virtual place may indicate activities that usually occur in the place such that advertisement may be displayed in the virtual place based on the activities. Any method may be used in determining a tag and all are included. For example, according to an embodiment, a tag may be determined based on a characteristic of the monitored activity. For example, an avatar 28 may be tagged based on the nature of the activity the avatar 28 is involved. If an avatar 28 is involved in a discussion of new models of cars in a virtual place, the avatar 28 may be tagged as "new car buyer". An avatar 28 may also be tagged based on the description of the avatar 28. For example, if avatar "A" describes himself as a sports car fan, tag assignment unit 1452 may assign avatar "A" a tag "sports car".

For a virtual place, the tag may also be assigned based on the activity that occurs therein. For example, a virtual place may be tagged based on a nature of the activities, and/or avatars 28 involved in the activities. The description of the virtual place may also be used to tag the virtual place.

According to an embodiment, description analysis unit 146 may determine a description-based tag on a consensus basis from a plurality of descriptions. That is, a tag that fits most of the provided descriptions may be used for the virtual object, e.g., a virtual place. In driving the consensus, description analysis unit 146 may also consider the weight assigned to a description.

According to an embodiment, multiple tags may be assigned to a virtual object to fit multiple aspects/situations of the virtual object. For example, an avatar 28 may be tagged as a sports car fan when he is driving on a road, may be tagged as a soft rock music fan when he is at home, and may be tagged as an investment expert when he is interacting with other avatars 28 in a professional forum.

In process S3, marketing unit 148 conducts a marketing activity based on the tag of a virtual object. Any marketing activity may be possible, and all are included. For example, the marketing activity may include displaying an advertisement, offering sales incentives, etc. For example, marketing unit 148 may display an advertisement to at least one of an avatar 28 in virtual universe 24 and user 12 of the avatar 28 in a physical environment (e.g., through a pop-up advertisement on the screen of virtual world client 30) based on a tag of the avatar 28. Marketing unit 128 may also place an advertisement on a virtual place based on a tag assigned to the virtual place. For example, the advertisement may be displayed on a screen of client 30 that user 12 uses to interact with server 14 in participating virtual universe 24.

According to an embodiment, the tags of multiple virtual objects may be considered in combination in determining the marketing activity. For example, it is assumed that an avatar "A" is tagged with "sports car" and "investment" and avatar "B" is tagged with "new car buyer" and "new house buyer", and a virtual club "C" is tagged with "car fans" and "high end wine". If avatars "A" and "B" talk in club "C", marketing unit 148 may determine that advertisements related to "sports car" and/or "car" may be the suitable advertisement displayed in club "C" and/or to avatars "A" and "B".

According to an embodiment, marketing unit 148 may also award an incentive to at least one of avatar 28 and user 12 of avatar 28 based on an amount of a "positive" tag assigned to avatar 28. A positive tag refers to a tag that indicates that avatar 28 conducting an activity that is encouraged in virtual universe 24. For example, the positive tag may include an amount of positive comments, e.g., "trustable man", an avatar 28 receives in communications. An incentive may be awarded to the avatar 28 based on the absolute amount of positive tags received by the avatar 28. The incentive may also be awarded based on a relative amount of positive tags, e.g., the percentage of positive feedbacks in all feedbacks, received by the avatar 28.

4. Conclusion

While shown and described herein as a method and system for conducting a marketing activity, it is understood that the invention further provides various alternative embodiments. For example, in an embodiment, the invention provides a program product stored on a computer-readable medium, which when executed, enables a computer infrastructure to conduct a marketing activity. To this extent, the computer-readable medium includes program code, such as marketing analysis system 132 (FIG. 2), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 2) and/or storage system 122 (FIG. 2), and/or as a data signal traveling over a network (e.g., during a wired/wireless electronic distribution of the program product).

In another embodiment, the invention provides a method of providing a system for conducting a marketing activity. In this case, a computer system, such as computer infrastructure 102 (FIG. 2), can be generated (e.g., created, deployed, maintained, having made available to, supported etc.) and one or more programs/systems, e.g., marketing analysis system 132 (FIG. 2), for performing the process described herein can be obtained (e.g., created, purchased, used, modified, etc.) and deployed to the computer system. To this extent, the deployment can comprise one or more of: (1) installing program code on a computing device, such as computing infrastructure 102 (FIG. 2), from a computer-readable medium; (2) adding one or more computing devices to the computer system; and (3) incorporating and/or modifying one or more existing devices of the computer system, to enable the computer system to perform the process described herein.

It should be appreciated that the teachings of the present invention could be offered as a business method on a subscription or fee basis. For example, a marketing center 16 (FIG. 1), and a computing device 104 comprising marketing analysis system 132 (FIG. 2) could be created, maintained and/or deployed by a service provider that offers the functions described herein for customers. That is, a service provider could offer to provide a service to conduct a marketing activity as described above.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for conducting a marketing activity, the method comprising:
    monitoring a virtual environment and collecting a plurality of descriptions of a virtual object within the virtual environment, each description provided by an avatar and associated with a particular situation of the virtual object, wherein the virtual object includes more than one situation;
    assigning a weight to each description based on a credibility of the avatars providing the plurality of descriptions;
    assigning a plurality of tags to the virtual object, each of the assigned tags associated with a particular situation of the virtual object, wherein each tag is determined based on the weight of each description and a consensus basis from the plurality of descriptions of the virtual object associated with the particular situation provided by each avatar, such that each tag that includes a majority of the plurality of descriptions for the particular situation is assigned; and
    conducting a marketing activity based on the tags assigned to a current situation of the virtual object.

2. The method of claim 1, wherein the virtual object includes a given avatar involved in the particular situation and the tag is assigned to the given avatar based on a description thereof provided by at least one of: the given avatar or another avatar involved in the particular situation.

3. The method of claim 2, wherein the conducting includes displaying an advertisement to at least one of: the given avatar in the virtual environment or a user of the given avatar in a physical environment.

4. The method of claim 2, wherein the conducting includes awarding an incentive to at least one of: the avatar or a user of the avatar based on an amount of positive tags assigned to the avatar.

5. The method of claim 1, wherein the conducting includes placing an advertisement in a virtual place.

6. A system for conducting a marketing activity, the system comprising:
    an activity monitoring unit for monitoring, using at least one computing device, a virtual environment, collecting a plurality of descriptions of a virtual object within the virtual environment, each description provided by an avatar and associated with a particular situation of the virtual object, wherein the virtual object includes more than one situation, and assigning a weight to each description based on a credibility of the avatar providing the plurality of descriptions;
    a tag assignment unit for assigning, using the at least one computing device, a plurality of tags to the virtual object, each of the assigned tags associated with a particular situation of the virtual object, wherein each tag is determined based on the weight of each description and a consensus basis from the plurality of descriptions of the virtual object associated with the particular situation, such that each tag that includes a majority of the plurality of descriptions for the particular situation is assigned; and
    a marketing unit for conducting, using the at least one computing device, a marketing activity based on the tags assigned to a current situation of the virtual object.

7. The system of claim 6, wherein the virtual object includes a given avatar involved in the particular situation and the tag assignment unit assigns, using the at least one computing device, a tag to the given avatar based on a description thereof provided by at least one of: the given avatar or another avatar involved in the particular situation.

8. The system of claim 6, wherein the marketing unit conducts, using the at least one computing device, at least one of:
    displaying an advertisement to at least one of: a given avatar in the virtual environment or a user of the given avatar in a physical environment; or
    placing an advertisement in a virtual place.

9. The system of claim 6, wherein the marketing unit awards, using the at least one computing device, an incentive to at least one of: an avatar or a user of the avatar based on an amount of positive tags assigned to the avatar.

10. A computer program product embodied in a non-transitory computer readable medium comprising: computer usable program code which, when executed by a computer system, enables the computer system to:
    monitor a virtual environment and collect a plurality of descriptions of a virtual object within the virtual environment, each description provided by an avatar and associated with a particular situation of the virtual object, wherein the virtual object includes more than one situation;
    assign a weight to each description based on a credibility of the avatar providing the plurality of descriptions;
    assign a plurality of tags to the virtual object, each of the assigned tags associated with a particular situation of the virtual object, wherein each tag is determined based on the weight of each description and a consensus basis from the plurality of descriptions of the virtual object associated with the particular situation provided by each avatar, such that each tag that includes a majority of the plurality of descriptions for the particular situation is assigned; and conduct a marketing activity based on the tags assigned to a current situation of the virtual object.

11. The program product of claim 10, wherein the virtual object includes a given avatar involved in the particular situation and the program code is configured to enable the computer system to assign the tag to the given avatar based on a description thereof provided by at least one of: the given avatar or another avatar involved in the particular situation.

12. The program product of claim 11, wherein the program code is further configured to enable the computer system to display an advertisement to at least one of: the given avatar in the virtual environment or a user of the given avatar in a physical environment.

13. The program product of claim 11, wherein the program code is further configured to enable the computer system to award an incentive to at least one of: the avatar or a user of the avatar based on an amount of positive tags assigned to the avatar.

14. The program product of claim 10, wherein the program code is configured to enable the computer system to place an advertisement in a virtual place.

15. A method for providing a system for conducting a marketing activity, comprising:
at least one of: creating, maintaining, deploying or supporting a computer infrastructure being operable to:
monitor a virtual environment and collect a plurality of descriptions of a virtual object within the virtual environment, each description provided by an avatar and associated with a particular situation of the virtual object, wherein the virtual object includes more than one situation;
assign a weight to each description based on a credibility of the avatar providing the plurality of descriptions;
assign a plurality of tags to the virtual object, each of the assigned tags associated with a particular situation of the virtual object, wherein each tag is determined based on the weight of each virtual object and a consensus basis from the plurality of descriptions of the virtual object associated with the particular situation provided by each avatar, such that each tag that includes a majority of the plurality of descriptions for the particular situation is assigned; and
conduct a marketing activity based on the tags assigned to a current situation of the virtual object.

16. The method of claim 15, wherein in the case the virtual object includes a given avatar involved in the particular situation, the computer infrastructure is further operable to assign the tag to the given avatar based on a description thereof provided by at least one of: the given avatar or another avatar involved in the particular situation.

17. The method of claim 16, wherein the computer infrastructure is further operable to display an advertisement to at least one of: the given avatar in the virtual environment or a user of the given avatar in a physical environment.

18. The method of claim 16, wherein the computer infrastructure is further operable to award an incentive to at least one of: the given avatar or a user of the given avatar based on an amount of positive tags assigned to the avatar.

* * * * *